United States Patent
Schickerling

[11] Patent Number: 6,112,420
[45] Date of Patent: Sep. 5, 2000

[54] BLADE CLAMP FOR RECIPROCATING SAW

[75] Inventor: Jason Schickerling, Mt. Prospect, Ill.

[73] Assignee: S-B Power Tool Company, Broadview, Ill.

[21] Appl. No.: 09/371,555

[22] Filed: Aug. 10, 1999

[51] Int. Cl.[7] .................................................. B27B 19/02
[52] U.S. Cl. ............................................. 30/392; 279/77
[58] Field of Search ........................... 30/392, 393, 394; 279/76, 77; 83/699.21

[56] References Cited

U.S. PATENT DOCUMENTS

| | | |
|---|---|---|
| 143,650 | 10/1873 | Weller . |
| 192,853 | 7/1877 | Victory . |
| 257,400 | 5/1882 | Snider . |
| 645,565 | 3/1900 | Manes . |
| 758,825 | 5/1904 | Converse . |
| 832,481 | 10/1906 | Hubby . |
| 928,370 | 7/1909 | Feickert . |
| 995,837 | 6/1911 | Aronson . |
| 1,204,622 | 11/1916 | Wallace . |
| 1,493,372 | 5/1924 | Moon . |
| 2,778,221 | 1/1957 | Kirby . |
| 3,542,097 | 11/1970 | Dudek ....................................... 143/156 |
| 4,106,181 | 8/1978 | Mattchen ................................... 279/77 |
| 4,294,013 | 10/1981 | Krieg ........................................ 30/392 |
| 4,648,182 | 3/1987 | Hoffman ................................... 30/392 |
| 5,322,302 | 6/1994 | Quirijnen .................................. 279/77 |
| 5,443,276 | 8/1995 | Nasser et al. ............................. 279/77 |
| 5,647,133 | 7/1997 | Dassoulas ................................. 30/392 |
| 5,697,279 | 12/1997 | Schnizler et al. ..................... 83/698.31 |
| 5,722,309 | 3/1998 | Seyerle ..................................... 30/392 |
| 5,987,758 | 11/1999 | McCurry et al. ......................... 30/392 |

*Primary Examiner*—Hwel-Slu Payer
*Attorney, Agent, or Firm*—Gardner, Carton & Douglas

[57] ABSTRACT

A blade clamp assembly has a housing and a clamping lever to hold a blade for a reciprocating saw. The clamping lever rotates about a pin within a cavity formed in the housing. The clamping lever includes a body portion having a cam face and a handle portion integrally formed with the body portion and extending from the trailing portion of the cam face. As assembled, the handle portion extends slightly out from the edge of the housing. A plate is provided between the cam face of the clamping lever and the floor of the cavity. A torsion spring is provided to bias the cam face against the plate to hold a blade by the assembly. The handle portion is used to overcome the torsion spring.

5 Claims, 3 Drawing Sheets

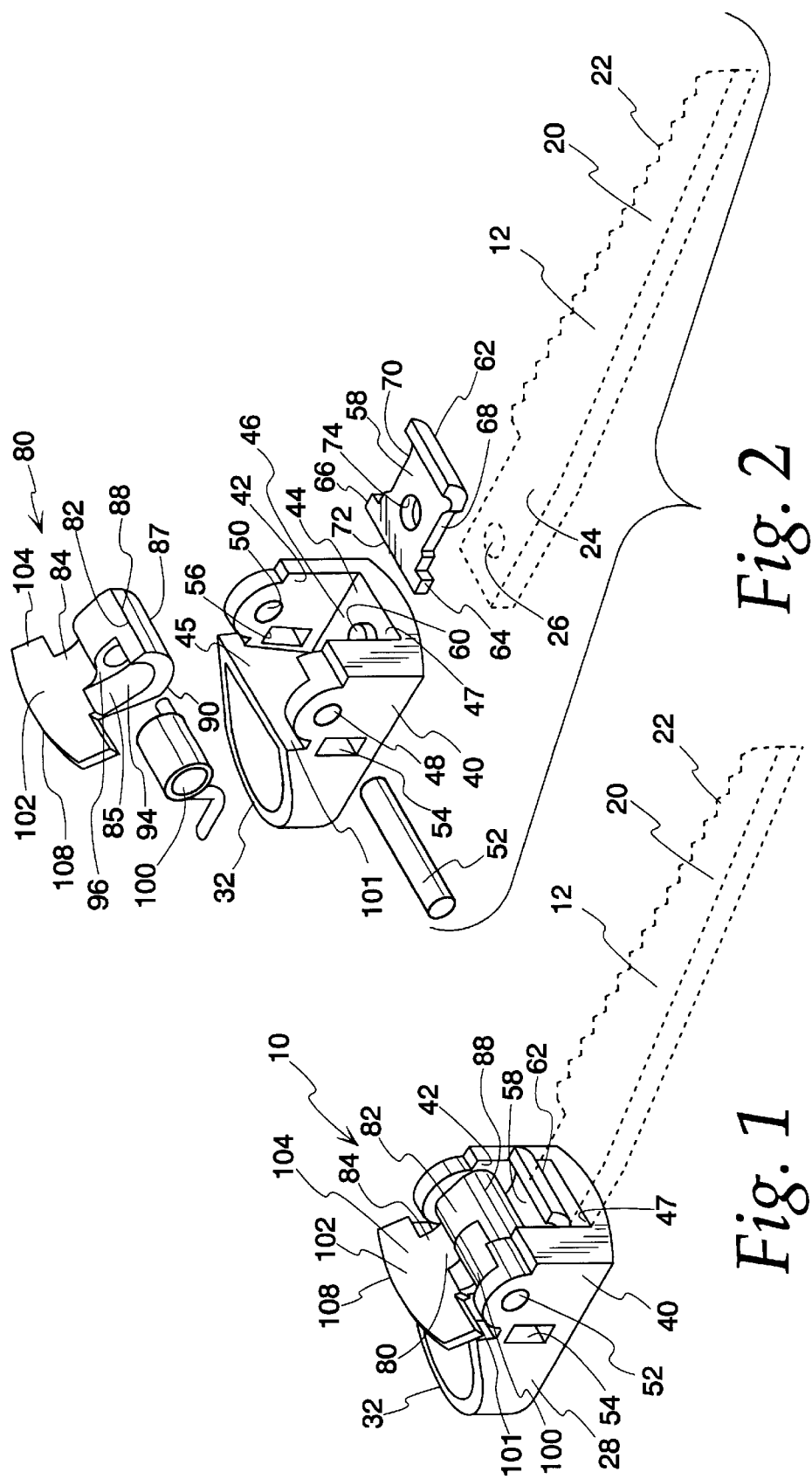

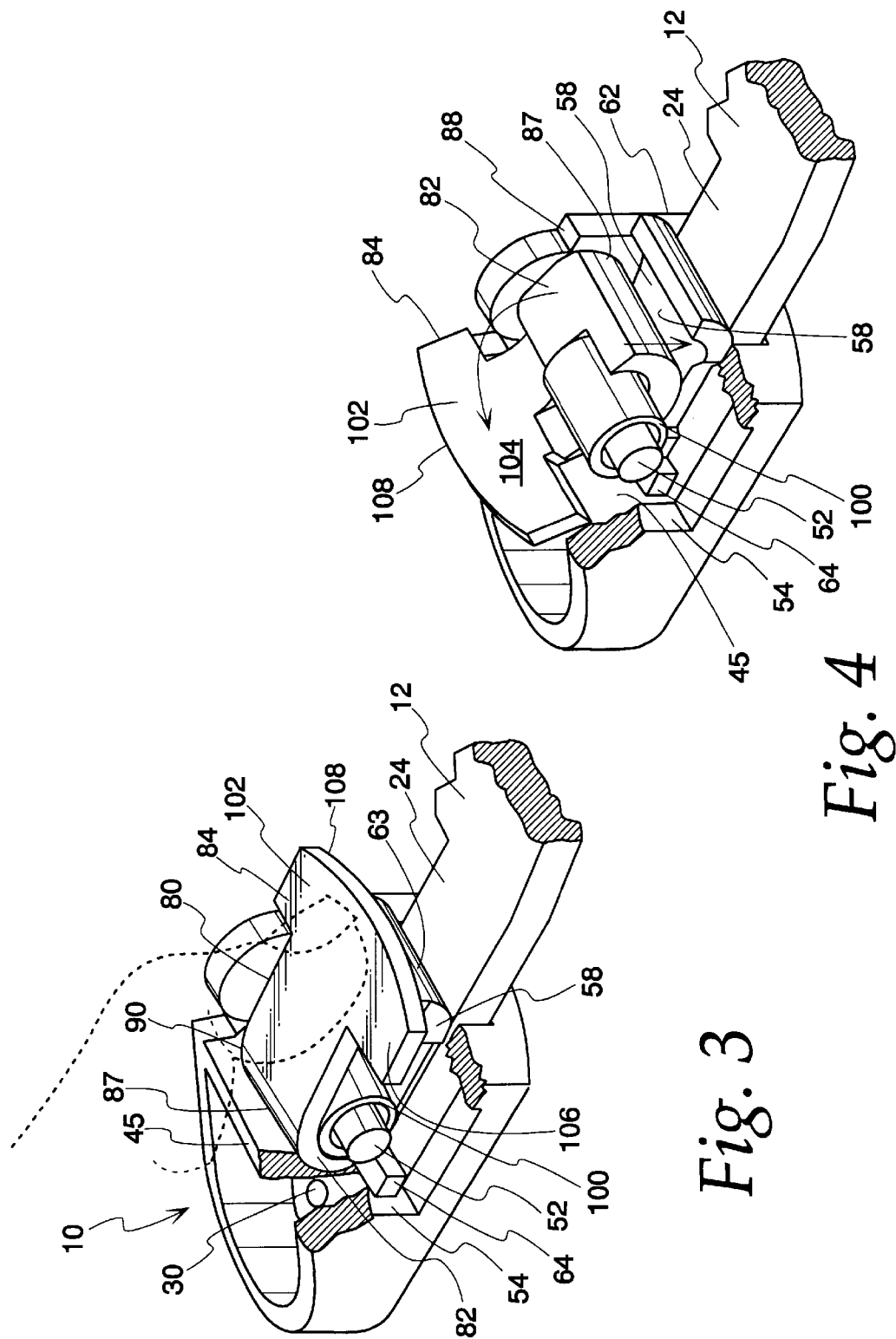

BLADE CLAMP FOR RECIPROCATING SAW

BACKGROUND OF THE INVENTION

1. Field of the Invention

The present invention relates to a mechanism for holding a saw blade to the reciprocating plunger of a tool, such as a power tool. More particularly, the present invention relates to a self locking, quick-release blade clamp assembly that will accommodate blades of varying thickness.

2. Scope of the Prior Art

Saw blades of the type under consideration have a planar cutting portion with teeth extending along one edge of the blade from the outer end thereof. These blades also have an integral co-planar mounting portion with an aperture adjacent the inner end of the blade. Typically, the reciprocating plunger of a power tool that will utilize blades of this type includes an opening or cavity to receive the mounting portion of a selected blade. Normally the plunger includes a short cylindrical projection that extends into the cavity for interengagement with the aforementioned blade aperture. Conventional blade holders of the type under consideration use a screw for tightly clamping the blade to the tool plunger. Of course, tightening of the screw requires use of a separate tool, such as a screwdriver or Allen wrench.

Other forms of blade holders are known in the prior art that use cam to hold the blade in place. U.S. Pat. No. 4,106,181 to Mattchen discloses a quick-release mechanism including a cam to hold the blade in place. The cam rotates a handle. U.S. Pat. No. 5,443,276 to Nasser et al discloses a spring biased cam that is rotated by a knob. The knob protrudes from the side of the housing that holds the cam. The use of a side knob can be bulky and difficult to operate. In order to reduce the dimensions of the blade holder, the knob must be kept relatively small making it difficult to overcome the torsion of the spring. U.S. Pat. No. 5,722,309 to Seyerle discloses a blade holder that uses a pivoting cam to hold the blade. The cam is biased by a spring that is exposed to the outside of the holder so that it can be damaged during operation of the saw. In addition, the handle is relatively long and extends out from the saw. Because of its length, the handle can be damaged during operation thereby reducing the effectiveness of the holder. The devices shown in these patents also are either overly complicated or difficult to operate or easily damaged.

SUMMARY OF THE INVENTION

The present invention relates to a self-locking blade clamp assembly that permits a blade to be quickly mounted to and disengaged from the tool without the aid of a separate tool. The blade clamp of the present invention includes a clamping lever rotationally mounted in a housing. A plate is provided to move within the housing. The clamping lever includes a cam face and an integrally formed handle that extends from a trailing edge of the cam face. The handle is relatively small and extends from an upper surface of the housing. A spring biases the clamping face into an engaged position to hold the blade by the assembly. The handle rotates the clamping lever and its cam face to a released position within to remove the blade.

The invention provides a self-locking feature in that the blade may be mounted in place simply by inserting the mounting portion of the blade in a cavity and held by the plate that is biased by a cam. The blade may be quickly released by manual operation of the handle. Further, the blade holder assembly of the present invention accommodates blades of varying thickness. Still further, the blade holder assembly of the present invention is not of complicated construction and thus lends itself to inexpensive manufacture. These and other objects and advantages of the invention will become apparent from the following specifications.

BRIEF DESCRIPTION OF THE DRAWINGS

FIG. 1 is a perspective view of the blade clamp assembly of the present invention;

FIG. 2 is an exploded isometric view of the blade clamp assembly;

FIG. 3 is a perspective view of the blade clamp assembly in the released position;

FIG. 4 is a perspective view of the blade clamp assembly in the engaged position;

DETAILED DESCRIPTION OF THE PREFERRED EMBODIMENT

Figure 7:
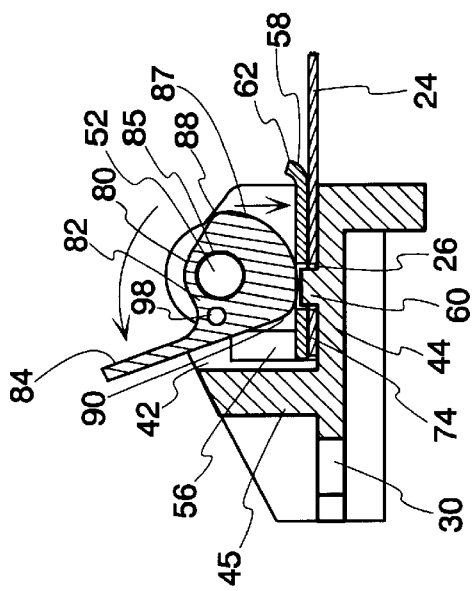
FIG. 7 is a cross-sectional view of the blade clamp assembly where the clamping lever holds the blade in the housing.

Referring to FIG. 1, the blade clamp assembly of the present invention, generally designated 10, is adapted to mount a blade, generally designated 12, to the reciprocating plunger (not shown) of a known type. It will be understood that the plunger forms part of a power operated, reciprocating saw, often referred to as a Recipro saw or Saber saw. The plunger can be of any known construction terminating at an outer end to which the blade clamp assembly 10 is connected.

The blade 12 is of conventional construction and includes a planar cutting portion 20. The blade includes a series of cutting teeth 22 extending along one longitudinal edge of the blade and terminating at the outer end of the blade. The blade 12 also includes a co-planar mounting portion 24 opposing the outerend. The mounting portion 24 includes an aperture 26.

The blade holder assembly 10 includes a housing 28 adapted to be secured to the plunger. In this respect, the housing 28 includes a bore 30 formed at end 32 of the housing 28 in coaxial alignment with a threaded bore (not shown) formed in the plunger. In a known fashion, a fastener (not shown) passes through the bore 30 and threadingly engages the bore found on the plunger to secure the housing 28 to the plunger. Other known methods can be used to connect the assembly 10 to the plunger.

The housing 28 also includes oppositely disposed walls 40 and 42 that are connected by floor 44 and a rear wall 45 to define a cavity 46. Cavity 46 is exposed by open end 47. Circular openings 48 and 50 are formed in walls 40, 42, respectively, and are shaped to receive the cylindrically shaped pin 52. The pin is held in place with respect to the housing by any known matter such as snap ring (not shown) connected to the ends of the pin and pushed against the outer surface of walls 40, 42. The walls 40, 42 also include rectangularly shaped slots 54, 56, which are preferably rectangularly shaped, that are formed to receive a portion of plate 58, described below. As seen, the floor 44 can include a short cylindrical projection, or pin, 60. In the preferred embodiment, the diameter of the pin 60 is approximately the diameter of aperture 26.

Figure 5:
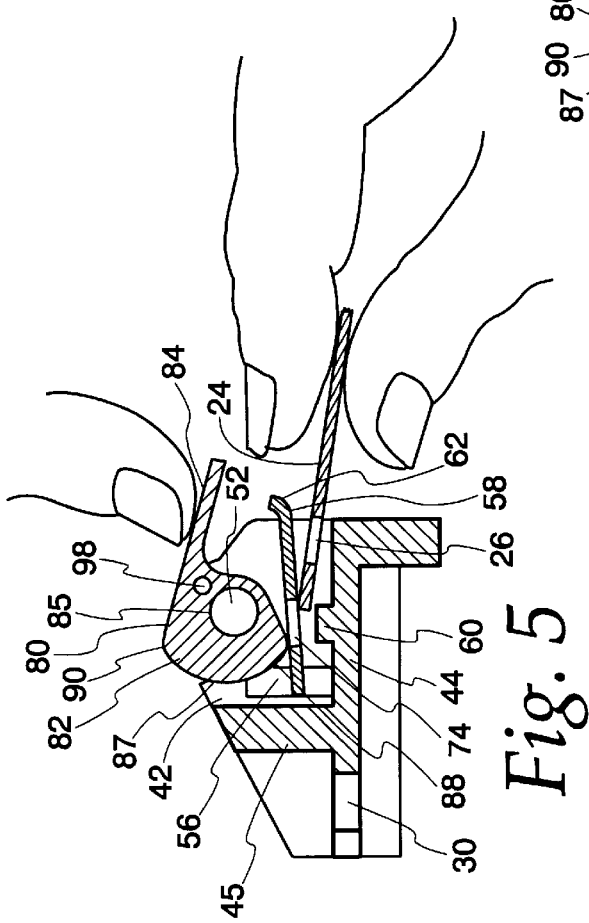
FIG. 5 is a cross-sectional view of the blade clamp assembly showing the insertion of the blade.

Plate 58 has a front edge 62 that is formed into a curved lip. Opposing wings 64 and 66 are formed on sides 68 and 70, respectively and adjacent the rear edge 72. The wings 64, 66 are designed to fit within slots 54, 56 to movably secure the plate within the cavity 46. Towards the center of plate 58, a circular hole 74 is configured. The diameter of hole 74 is approximately the diameter of pin 60 and aperature 26. In the preferred embodiment, the plate 58 is arranged in the cavity 46 so that the wings 64, 66 move through slots 54, 56 between or lower position and a displaced position off the floor 44. In the lower position, as seen in FIGS. 4 and 7, the plate is against the floor 44 or blade 12. The displaced position, the wings move through the slots towards the upper end of the housing so that a gap is provided between the floor 44 or blade 12 and the plate 58, as seen in FIGS. 3 and 5.

As shown in the Figures, the present invention includes a clamping lever 80 that has a body portion 82 at one end and an integrally formed handle portion 84 at an opposing end. The clamping lever is pivotally arranged within the cavity 46 formed by housing 28. The lever 80 rotates about an axis that is formed by bore 85. Pin 52 fits through bore 85 to hold the clamping lever to the housing 28. As will be described, the clamping lever rotates or pivots about the pin.

Body portion 82 includes an arcuate cam face 87 at the one end of the lever 80. As is known in the art, the cam face 87 can be defined by a segment of an imaginary cylinder having its central axis parallel and offset with respect to the axis of rotation of the clamping lever 80, i.e. bore 85 and pin 52. The cam face 87 has a leading portion 88 and a trailing portion 90. It will be appreciated that the trailing portion 90 is spaced from the axis of rotation to cam face an extent greater than the leading portion 88 of the cam face. A cutout portion 94 is also formed within body portion 82 proximate the bore 85. In a wall 96 formed by the portion 94, the body portion includes a hole 98. A torsion spring 100 is arranged over the pin 52 prior and is placed in cutout portion 94. One end of the spring 100 is placed in the hole 98 and the other end is placed in a recess 101 formed in the housing. The spring biases the cam face and its trailing portion 90 against the plate 58 and the floor 44.

As mentioned, the handle portion 84 is integrally formed with the body portion and extends directly from the trailing edge 90 of the cam face 87 and out from the body portion 82. The handle portion includes a flat plate 102 having a first side 104 and an opposing second side 106. The outer edge 108 of the plate is ergonomically designed and is preferably arcuate. When the clamping lever 80 is assembled in the housing, a portion of the plate 102 extends out from the upper edge of rear wall 45. Thus, the handle portion 84 is easily accessibly to hold for operation. The size of the plate 102 is adjusted so that it can be grabbed for rotation about the pin 52, but does not significantly protrude from the housing. The shape and arrangement of the plate 102 is such that the clamping lever 80 easily rotates and overcomes the torsion spring, yet it also ergonomic and not obstruct the use of the blade or saw. In addition, accidental knocks on the plate will not alter the shape and effectiveness of the clamping lever.

Figure 6:
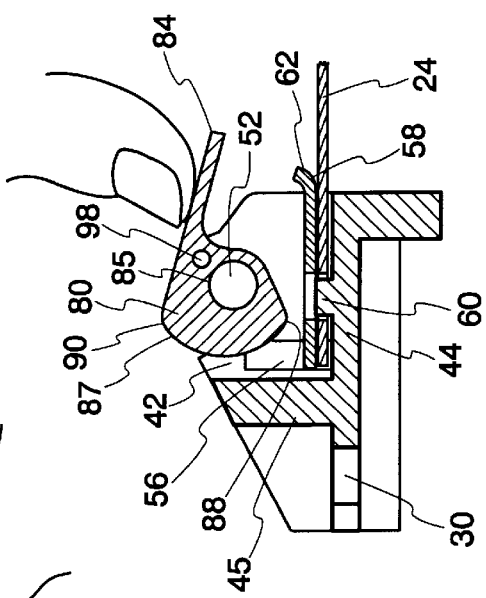
FIG. 6 is a cross-sectional view of the blade inserted into the housing.

Referring to FIGS. 3 through 7, it will be understood that the blade 12 is quickly mounted in place by inserting the mounting portion 24 within the cavity 46. To insert the blade 12 into the clamping assembly 10, the handle portion 84, or plate 102, is rotated in a clockwise direction. This is shown in FIGS. 3 and 5. A gap is provided between the floor 44 and the plate 58 so that the mounting portion of the blade can be inserted into the cavity. When the blade is inserted and the handle portion 84 is released, the torsion spring 100 will act to urge the clamping lever 80 in a counterclockwise direction against the plate 58 to hold blade in place. To assist in holding the blade in place, the projection 60 is inserted into the aperture 26 and the plate hole 74, as shown in FIGS. 6 and 7. The clamping lever, the plate 58 and the projection secure the blade in a longitudinal direction.

In order to release the blade, the handle portion 84 pivots about the pin 52 so that clamping lever 80 pivots about the pin 52 in a clockwise direction. The trailing edge 90 will be released from the plate 58 so that the plate 58 and blade 12 can move against the smaller leading edge 88. A gap is provided between the floor 44 and the plate 58 so that the aperture can be dislogded from the projection and the blade removed from the assembly. The handle portion 84 is released and the trailing edge 90 is biased against the plate 58 by the spring. Because of the varying arcuate shape of the cam face, the blade clamp assembly can hold blades of various thicknesses as is known in the art.

While the invention has been described in connection with a preferred embodiment, it is not intended to limit the scope of the invention to the particular embodiment set forth, but on the contrary, it is intended to cover such alternatives, modifications and equivalents as may be included within the spirit and scope of the invention as defined by the appended claims.

What is claimed is:

1. A blade clamp assembly for a blade having a planar cutting portion terminating at an outer end of the blade and a co-planar mounting portion terminating at an inner end of the blade, the clamp assembly for removably mounting a blade to a saw and comprising:

(a) a housing having a floor portion, a first side and an opposing second side extending generally perpendicularly from the floor portion to create a cavity, (b) a one-piece clamping lever between the first side and the opposing side for rotation about an axis parallel with the plane of the blade and perpendicular to the longitudinal axis of the blade wherein the clamping lever including an integral handle portion that extends out of the cavity from an open end of the housing opposing the floor portion and rotates the clamping lever about its axis of rotation parallel with the plane of the blade;

(c) the clamping lever having an arcuate cam face, and (d) spring means mounted on the housing and engaged with the clamping lever for biasing the clamping lever to rotate about the axis of rotation parallel with the plane of the blade in a direction urging the cam face into an engaged position to hold the blade within the cavity, the handle portion overcoming the spring means to rotate the cam face into a released position wherein the blade is removable from the cavity.

2. The blade clamp assembly according to claim 1 further comprising a plate movably engaged within slots formed in the housing so that the plate is fitting within the cavity between the floor portion and the cam face so that the plate is biased against the blade in the engaged position.

3. The blade clamp assembly according to claim 1 wherein the housing includes a projection formed on the floor portion wherein the projection fits into a hole formed in mounting portion of the blade when the blade is mounted in the assembly.

4. The blade clamp assembly according to claim 1 further comprising a pin passing through openings formed in the first and second sides of the housing and a bore formed along the axis of the clamping lever, wherein the clamping lever rotates about the pin.

5. The blade clamp assembly according to claim 1 wherein the handle portion extends from a trailing edge of the cam face.

\* \* \* \* \*